Patented May 1, 1934

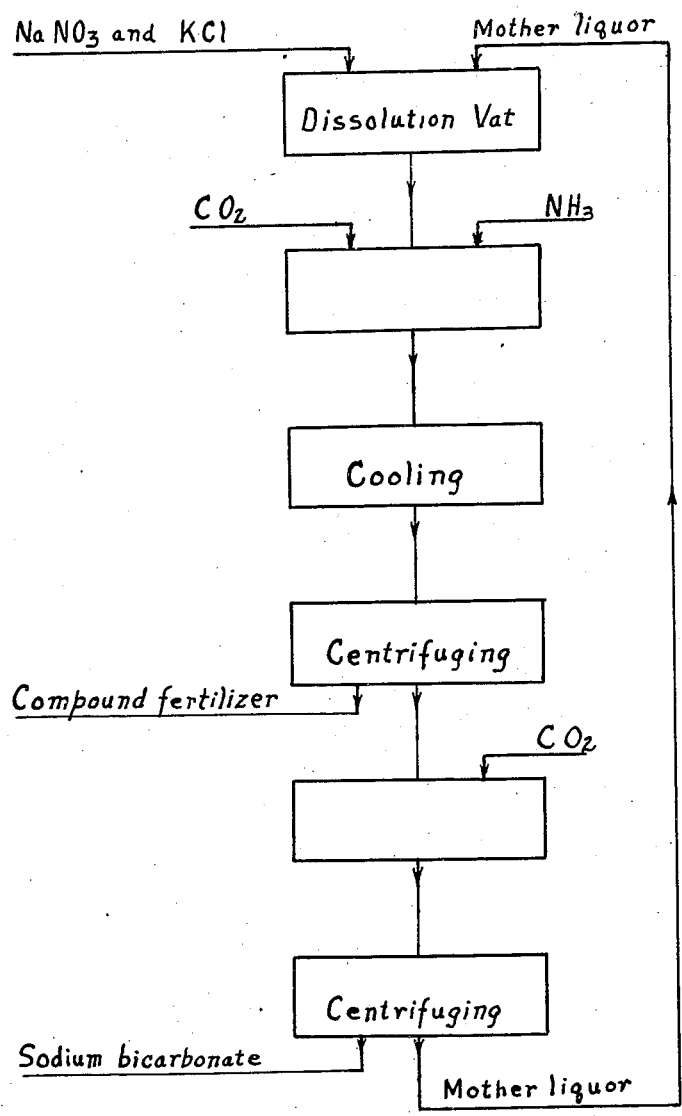

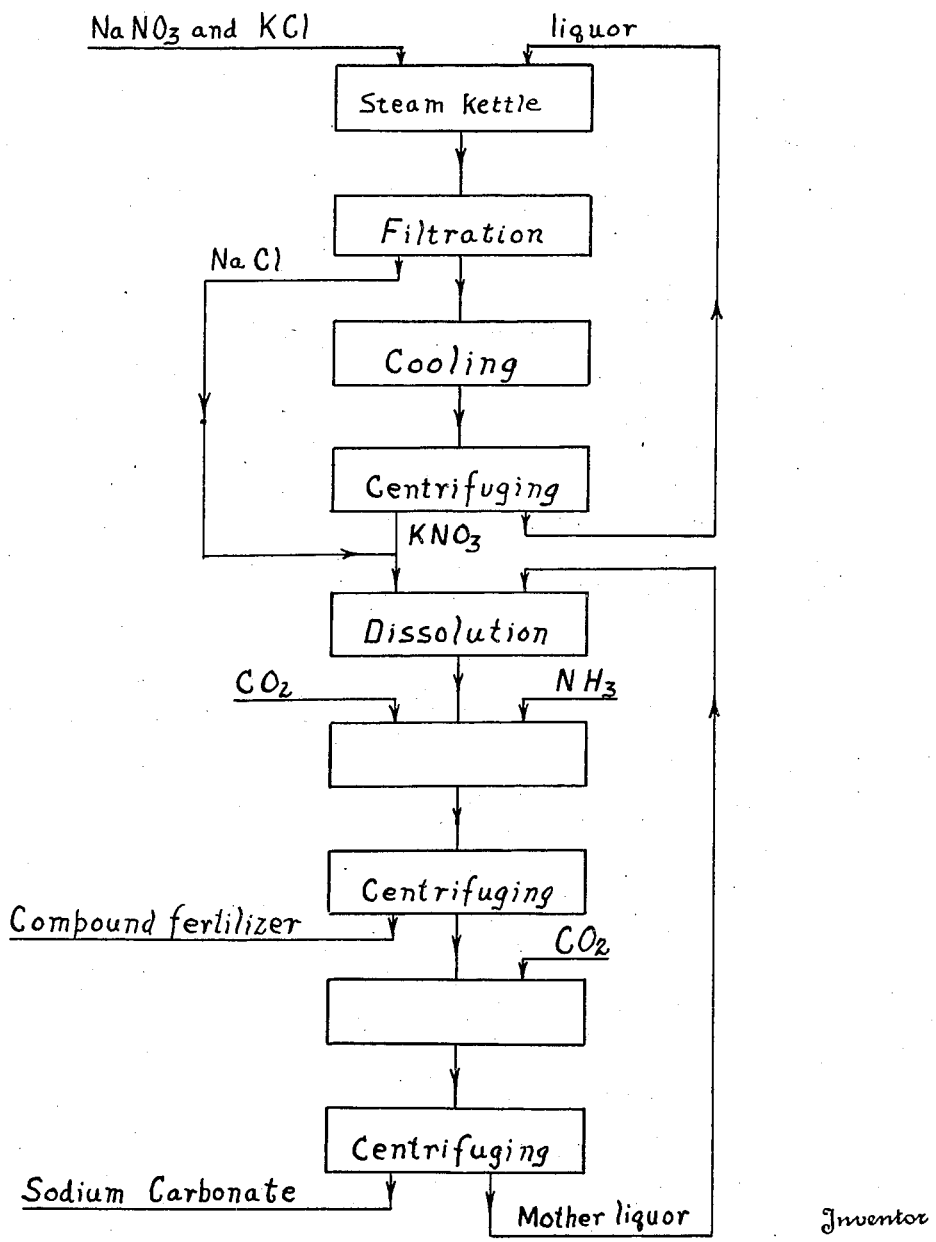

1,957,350

UNITED STATES PATENT OFFICE 1,957,350

COMPOUND FERTILIZER AND PROCESS FOR MANUFACTURING SAME

Jean Paul Louis Remy-Neris, Paris, France, assignor to Societe Chimique de la Grande Paroisse Azote et Produits Chimiques, Paris, France, a corporation of France Application November 2, 1929, Serial No. 404,517
In France November 20, 1928

5 Claims. (Cl. 71—9)

This invention relates to a compound fertilizer and process for manufacturing same.

Compound fertilizers containing several fertilizing constituents have long been known and their favourable action in agriculture has been demonstrated. Such fertilizers are usually prepared by mixing two or more separately manufactured salts, but this procedure, although usually enabling a perfectly homogeneous product to be obtained, is often complicated and expensive, since it entails the existence of separate manufacturing plants for each of the salts employed, and also a mixing plant.

It is manifestly more advantageous to prepare the compound fertilizer by chemical methods in a single series of operations. Moreover, manufacturers are already proceeding on these lines and supplying consumers with compound fertilizers prepared by chemical methods and containing two fertilizing ingredients, or the same constituent in two distinct forms, such, for example, as potassium nitrate, ammonium nitrate and the fertilizer known as potazote.

It is known in the prior art to carry out the reaction of double decomposition:

$$NaNO_3 + KCl = KNO_3 + NaCL \quad (a)$$

and to separate the potassium nitrate thus produced, but this fertilizer does not contain any ammoniacal nitrogen, and the sodium chloride accompanied with a certain quantity of potassium nitrate, which it is impossible to recover except at the price of laborious washing, is lost.

It is also known to provide the following reactions:

$$NaCl + CO_2 + NH_3 + H_2O = NH_4Cl + NaHCO_3 \quad (b)$$

$$KCl + NaCl + CO_2 + NH_3 + H_2O =$$
$$NH_4Cl + KCl + NaHCO_3 \quad (c)$$

and to recover separately the sodium bicarbonate and the ammonium chloride or the mixture of the chlorides of ammonium and potassium which is known under the name of "potazote", but this fertilizer does not contain any nitric nitrogen.

It is also known to provide the following reaction:

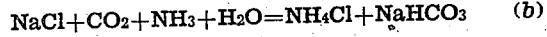
$$NaNO_3 + CO_3 + NH_3 + H_2O =$$
$$NH_4NO_3 + NaHCO_3 \quad (d)$$

but the fertilizer resulting therefrom not only is so extremely hygroscopical as to limit its use but also does not contain any potassium.

According to the present invention, it has been found that it is possible to combine in an easy manner these known reactions in such a way as to result in a complete manufacturing cycle, furnishing, without loss, on one hand bicarbonate of soda and on the other hand a compound fertilizer comprising principally potassium nitrate and ammonium chloride and of which the composition in fertilizing materials may be modified within wide limits according to the needs of agriculture.

The process according to the invention consists in transforming, according to reaction (a), either partially or completely sodium nitrate and potassium chloride, or the natural or artificial products containing these salts, into potassium nitrate and sodium chloride, and then submitting all or part of these resulting salts to the action of carbon dioxide, ammonia and water, in such a way as to result in reactions (b) and (d).

The presence of the potassium nitrate and potassium chloride does not constitute an obstacle to the execution of these reactions, and these salts precipitate at the same time that the ammonium chloride and the ammonium nitrate, in such a way that it is possible to recover on the one hand the sodium bicarbonate and on the other hand a compound fertilizer comprising principally ammonium chloride and potassium nitrate and which may contain in addition ammonium nitrate and potassium chloride if the initial mixture of salts contains an excess of sodium nitrate or of potassium chloride.

One can easily understand that it is possible by varying the relative proportions of sodium nitrate and potassium chloride as well as the proportion of sodium chloride which in general accompanies these two salts, to obtain an entire series of compound fertilizers which will have the general formula: $pNH_4CL$, $qNH_4NO_3$, $rKCl$, $sKNO_3$ in which $p$, $q$, $r$ and $s$ may represent any values whatsoever.

For putting these processes into practice advantage may be taken of the methods already known, particularly the Schreib process (German Patent No. 36,093) and the processes derived therefrom, such as those which are described by French Patent No. 501,147 of August 24, 1918 and French Patent No. 524,576 of March 17, 1920.

Nevertheless, I shall give two methods for the execution of my process. These examples are understood to be illustrative and not definitive.

According to the first method, I introduce into the mother-liquors utilized in a closed cycle and coming from a series of prior operations, sodium nitrate, potassium chloride, ammonia in quantity corresponding to the quantity of sodium ions introduced, and enough carbon dioxide to reduce the ammonia to the state of neutral ammonium carbonate. The object of this treatment is to precipitate the mixture of salts constituting the desired compound fertilizer. I separate this precipitate after cooling down the liquor, and I treat the mother-liquors with another quantity of carbon dioxide for the purpose of precipitating in the form of bicarbonate all the sodium introduced at the beginning. This precipitate is separated and the mother-liquors resulting from this separation are then ready to be utilized again in a new cycle of operations.

Fig. 1 is a flow diagram of the order of operations according to this first method.

According to my second method, I employ the reaction of double decomposition between the sodium nitrate and the potassium chloride without the necessity of endeavoring to extract from the sodium chloride precipitate the small quantities of potassium nitrate carried along. Thereafter, in the mother-liquors utilized in the closed cycle and coming from the previous operations, I introduce all or part of the potassium nitrate and sodium chloride, then ammonia in quantity corresponding to the quantity of introduced sodium ions, and enough carbon dioxide to change the ammonia to the state of neutral ammonium carbonate. The object of this treatment is to precipitate the mixture of salts constituting the desired compound fertilizer. After cooling, this precipitate is separated, and the mother-liquors are treated by a fresh quantity of carbon dioxide for the purpose of precipitating in the form of bicarbonate all the sodium introduced at the beginning of the operation. This precipitate is separated, and the mother-liquors resulting from this separation are then ready to be utilized again in a new cycle of operations.

Fig. 2 is a flow diagram of the order of operations according to the second method.

The herein described process of manufacturing fertilizers is manifestly independent of the origin of the raw materials employed. The potassium chloride may be used, either as extracted from sylvinite or other native potash minerals, or in the form in which it is contained in said minerals without extraction by a preliminary treatment. The sodium nitrate may be either the native product, or synthetic nitrate, and it is particularly advantageous to treat the nitrate resulting from the action of nitric acid or oxides of nitrogen on alkali chlorides, since the presence of untransformed sodium chloride has no adverse effect on the application of the process. The hydrochloric acid vapour and oxides of nitrogen resulting from the decomposition of the chlorides may be absorbed by sodium carbonate or ammonia, and the mixture of salts resulting from such absorption will be introduced into the cycle of the manufacturing operations. The nitrate resulting from the action of nitric acid or oxides or nitrogen on the sodium bicarbonate or carbonate produced in the process itself may also be employed with advantage, said sodium bicarbonate or carbonate thus finding direct utilization in the manufacturing process. In this particular case, the amount of $CO_2$ consumed by the process is reduced to that needed to compensate leakages, so that the sole raw materials employed will be potassium chloride, nitric acid or oxides of nitrogen, and ammonia; and all these products will be found again in the fertilizer finally obtained. The presence of a little sodium chloride in admixture with the potassium chloride will give rise to the formation of a corresponding amount of sodium carbonate, which will serve to make good the losses.

The following examples illustrate several embodiments of the invention.

*Example 1*

A mixture of two molecular proportions of sodium nitrate and one molecular proportion of potassium chloride is subjected to reaction (a) in the presence of water and in accordance with known methods. By this method is obtained a mixture of potassium nitrate, sodium chloride with a little unchanged sodium nitrate which is found to be either entirely in the solid state or partly in a solid state and partly in solution. This mixture of substances solid or partially dissolved is introduced into the mother-liquors utilized in a closed cycle and from which during the course of a previous operation the sodium bicarbonate has been separated. Then two molecular proportions of ammonium and one molecular proportion of carbon dioxide are added, the liquor is cooled and the precipitate which constitutes the desired compound fertilizer is filtered out. Then another molecule of carbon dioxide is added to the liquor, the sodium bicarbonate is filtered out, and the mother-liquors are taken out to provide material for a new cycle of operations.

The fertilizer resulting from this process corresponds approximately to the formula: $NH_4Cl$, $NH_4NO_3$, $KNO_3$ and contains as fertilizing constituents 12% of nitric nitrogen, 12% of ammoniacal nitrogen and 20% of $K_2O$.

*Example 2*

An equimolecular mixture of sodium nitrate and potassium chloride is subjected to the treatment described in the preceding example, a compound fertilizer being produced which corresponds to the formula $NH_4Cl$, $KNO_3$, and containing as fertilizing constituents 9% of nitric nitrogen, 9% of ammoniacal nitrogen and 30% of $K_2O$.

*Example 3*

Sodium carbonate is treated with the oxides of nitrogen resulting from the oxidation of ammonia, and with oxygen, the sodium nitrate resulting from this operation being introduced into the usual cycle of operations, together with potassium chloride, in the proportion of one molecule of nitrate to two molecules of chloride. The resulting fertilizer corresponds to the formula $NH_4Cl$, $KCl$, $KNO_3$ and contains as fertilizing constituents, 6.1% of nitric nitrogen, 6.1% of ammoniacal nitrogen and 34% of $K_2O$.

I claim:—

1. A process for the manufacture of a compound fertilizer, which comprises adding to the liquor used in a cycle and from which sodium bicarbonate has been removed in the course of a previous operation, ammonia, carbon dioxide and a mixture containing sodium nitrate and potassium chloride, collecting the precipitated salts which consist mainly of potassium nitrate and ammonium chloride, treating the remaining liquor with carbon dioxide to precipitate sodium bicarbonate, collecting the sodium bicarbonate, and returning the remaining liquor to the beginning of the process.

2. A process for the manufacture of a compound fertilizer, which comprises adding to the liquor used in a cycle and from which sodium bicarbonate has been separated in the course of a previous operation, a mixture containing sodium nitrate and potassium chloride, an amount of ammonia which corresponds to the amount of Na ions added, and enough carbon dioxide to change all the ammonia into neutral ammonium carbonate, cooling the solution, collecting the precipitated salts which consist mainly of potassium nitrate and ammonium chloride, treating the remaining solution with carbon dioxide to precipitate sodium bicarbonate, collecting the sodium bicarbonate, and returning the remaining liquor to the beginning of the process.

3. A process for the manufacture of a compound fertilizer, which comprises adding to the liquor used in a cycle and from which sodium bicarbonate has been separated in the course of a previous operation, ammonia, carbon dioxide and a mixture containing sodium nitrate and potassium chloride, cooling the solution, collecting the precipitated salts, treating the remaining liquor with carbon dioxide to precipitate sodium bicarbonate, collecting the sodium bicarbonate, returning the remaining liquor to the beginning of the process, treating the sodium bicarbonate with nitric acid to form sodium nitrate and carbon dioxide, and returning said sodium nitrate and carbon dioxide to the process.

4. A process for the manufacture of a compound fertilizer, which comprises producing potassium nitrate and sodium chloride from potassium chloride and sodium nitrate, adding to a liquor used in a cycle and from which sodium bicarbonate has been separated in the course of a previous operation, ammonia, carbon dioxide and the mixture of potassium nitrate and sodium chloride, cooling the solution, collecting the precipitated potassium nitrate and ammonium chloride, treating the remaining liquor with carbon dioxide to precipitate sodium bicarbonate, collecting the sodium bicarbonate, and returning the remaining liquor to the process.

5. A process for the utilization of sodium nitrate which consists in combining its $NO_3$ ion into potassium nitrate and its Na ion into sodium bicarbonate and comprises adding said sodium nitrate together with potassium chloride, ammonia and carbon dioxide to a liquor used in a cycle, cooling the solution, collecting the precipitated salts, treating the remaining liquor with carbon dioxide, collecting the precipitated sodium bicarbonate and returning the remaining liquor to the process.

JEAN PAUL LOUIS REMY-NERIS.